(12) United States Patent
Eckhoff

(10) Patent No.: US 9,120,057 B2
(45) Date of Patent: Sep. 1, 2015

(54) METHOD FOR OPERATING EXHAUST GAS PURIFICATION SYSTEMS

(75) Inventor: Stefan Eckhoff, Alzenau (DE)

(73) Assignee: UMICORE AG & CO. KG, Hanau (DE)

( * ) Notice: Subject to any disclaimer, the term of this patent is extended or adjusted under 35 U.S.C. 154(b) by 0 days.

(21) Appl. No.: 14/355,885

(22) PCT Filed: Dec. 1, 2011

(86) PCT No.: PCT/EP2011/071546
§ 371 (c)(1),
(2), (4) Date: May 21, 2014

(87) PCT Pub. No.: WO2013/079117
PCT Pub. Date: Jun. 6, 2013

(65) Prior Publication Data
US 2014/0314646 A1   Oct. 23, 2014

(51) Int. Cl.
*B01D 53/94* (2006.01)
*F01N 3/24* (2006.01)
*F01N 3/08* (2006.01)
*F01N 13/00* (2010.01)

(52) U.S. Cl.
CPC .......... *B01D 53/9495* (2013.01); *F01N 3/0885* (2013.01); *F01N 13/009* (2014.06); *F01N 2410/03* (2013.01); *Y02T 10/20* (2013.01)

(58) Field of Classification Search
CPC ....... F01N 3/2053; F01N 3/2892; F01N 3/24; B01D 53/94
USPC ........................................... 60/287, 288, 324
See application file for complete search history.

(56) References Cited

U.S. PATENT DOCUMENTS

| | | | |
|---|---|---|---|
| 3,440,817 A | 4/1969 | Säufferer | |
| 3,910,040 A | 10/1975 | Garcea | |
| 5,603,216 A * | 2/1997 | Guile et al. | 60/288 |
| 6,012,284 A | 1/2000 | Tanaka et al. | |
| 6,192,675 B1 * | 2/2001 | Hirota et al. | 60/286 |
| 8,475,754 B2 * | 7/2013 | Eigenberger et al. | 423/213.2 |
| 8,776,498 B2 * | 7/2014 | Gandhi et al. | 60/286 |
| 2005/0132696 A1 | 6/2005 | Tumati et al. | |
| 2010/0139246 A1 * | 6/2010 | Andersson et al. | 60/276 |

FOREIGN PATENT DOCUMENTS

| | | |
|---|---|---|
| DE | 1451881 | 1/1969 |
| DE | 2409 643 | 9/1974 |
| DE | 19822798 A1 | 11/1998 |
| DE | 10 2008 007 844 | 9/2008 |
| DE | 10 2010 033 688 | 3/2011 |
| DE | 10 2010 033 689 | 3/2011 |
| DE | 102010014468 A1 | 10/2011 |
| EP | 0 640 757 A2 | 1/1995 |

(Continued)

OTHER PUBLICATIONS

International Search Report for PCT/EP2011/071546: mailed Aug. 1, 2012.

*Primary Examiner* — Timothy Vanoy
(74) *Attorney, Agent, or Firm* — Smith, Gambrell & Russell, LLP

(57) ABSTRACT

The invention relates to a method for purifying exhaust gas in vehicles with internal combustion engines. The method is characterized in that exhaust gas coming from the engine (1) is then led past the catalyst(s) (4) near the engine when the engine of the vehicle is not performing positive work.

18 Claims, 1 Drawing Sheet

(56) References Cited

FOREIGN PATENT DOCUMENTS

| | | | |
|---|---|---|---|
| EP | 1 486 248 | 12/2004 | |
| EP | 2 146 071 A2 | 1/2010 | |
| GB | 1385331 A * | 2/1975 | ............. B01D 53/86 |
| GB | 1393178 A * | 5/1975 | ................ F01N 3/20 |
| JP | 2003-193895 | 7/2003 | |
| WO | WO 0043648 A1 * | 7/2000 | ................ F01N 3/08 |
| WO | 2011/124357 | 10/2011 | |

\* cited by examiner

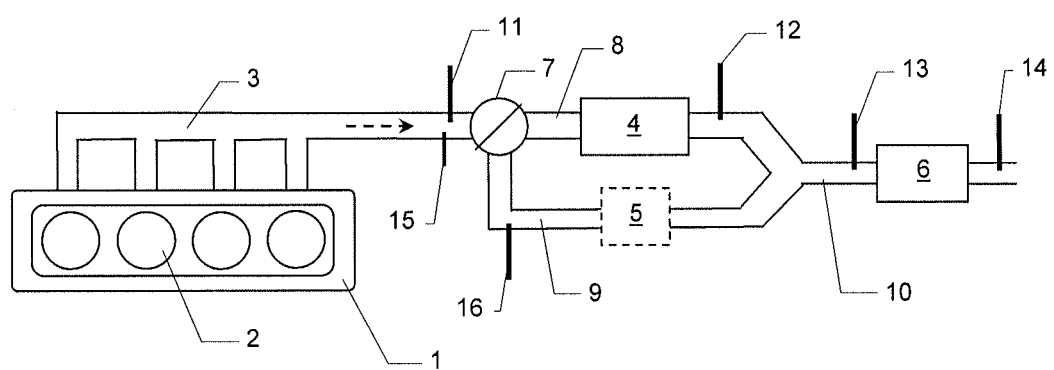

METHOD FOR OPERATING EXHAUST GAS PURIFICATION SYSTEMS

The present invention is directed to a method for purifying exhaust gas in vehicles with internal combustion engines. The method is distinguished by the fact that exhaust gas coming from the engine is directed past one or more close-coupled catalyst(s) when the internal combustion engine of the vehicle is not performing any positive work.

The emissions contained in the exhaust gas of a motor vehicle can be divided into three groups. Thus, the term "primary emissions" refers to pollutant gases which are formed directly in the engine by the fuel combustion process and are present in what is referred to as the untreated exhaust gas at the cylinder outlet. The untreated exhaust gas from lean burn engines (diesel, lean GDI inter alia with stratified charge operation) contains not only the usual primary emissions, namely carbon monoxide (CO), hydrocarbons (HC) and nitrogen oxides ($NO_x$), but also a relatively high proportion of oxygen of up to 15% by volume. Moreover, there can also be particulate emissions, which consist predominantly of soot residues and possibly organic agglomerates and are due to partially incomplete fuel combustion in the cylinder.

A lean burn engine is an internal combustion engine in which the air/fuel mixture is kept within the lean range, in particular a diesel engine or a lean-mixture spark ignition engine with direct gasoline injection (lean GDI) and stratified charge operation. As already indicated above, "lean" means that there is more combustion air than is required for stoichiometric combustion of the fuel in the cylinder. The excess air has the effect that the combustion temperature and, as a result, the concentration of nitrogen oxides in the exhaust gas are reduced. The combustion air ratio $\lambda$ (lambda) is a number used to describe the mixture composition consisting of air and fuel. The combustion air ratio relates the air mass that is actually available for combustion to the minimum stoichiometric air mass required for complete combustion. The term "lean burn engines" is used for engines which are operated temporarily or predominantly in a $\lambda$ range of >1. The diesel engine, in particular, is a classic lean burn concept, which is operated with an excess of air ($1.3 < \lambda < 2.2$).

Conventional spark ignition engines operate at an air ratio of around $\lambda=1$. A lambda probe ahead of the catalyst measures the oxygen content in the exhaust gas and transmits signals for control of the air supply to the control unit of the engine. Modern spark ignition engine concepts, such as direct gasoline injection, allow lean burn operation over wide load ranges, this being associated with an advantage in terms of fuel consumption over stoichiometric concepts.

Compliance with legal exhaust emissions limits for vehicles that will apply in future in Europe, North America and Japan requires effective removal of all pollutants from the exhaust gas. The pollutant gases carbon monoxide and hydrocarbons from the lean exhaust gas can be neutralized easily by oxidation over a suitable oxidation catalyst. Particulate filters with or without an additional catalytically active coating are suitable devices for removing the particulate emissions. Reduction of the nitrogen oxides to nitrogen is more difficult because of the high oxygen content of the exhaust gas from lean burn internal combustion engines. Known methods are based either on the use of nitrogen oxide storage catalysts (NSC) or are methods for selective catalytic reduction (SCR), generally by means of ammonia as a reducing agent, over a suitable catalyst, referred to for short as an SCR catalyst.

As will easily be appreciated, exhaust gas purification systems which are to meet current and future exhaust emissions standards must be constructed from several components in order to be able to satisfy the limits envisaged. There is the additional difficulty here of controlling the individual components of the exhaust gas purification system in such a way that an optimum final outcome can be achieved. An important fact in this context is that the exhaust gas purification components often have a preferential temperature range in which they have an optimum action. When the temperatures are too low, catalytic purification does not start. When the temperature of the exhaust gas is too high, there is the risk of damage to the catalyst.

The exhaust gas from vehicles with modern internal combustion engines is becoming increasingly cooler since the engines are being optimized for lower fuel consumption. As a result, exhaust gas aftertreatment by means of catalysts is becoming more and more difficult and expensive. The temperatures required in the catalyst for effective exhaust gas aftertreatment are now only achieved well after cold starting. As a compensatory measure, to increase the activity of the catalysts, greater and greater quantities of noble metals must be used in the catalysts, or the catalysts must be heated to ensure that they have a sufficiently high activity, and this, in turn, has a disadvantageous effect on fuel consumption. Exhaust gas temperatures are particularly low in the case of internal combustion engines which are operated predominantly with a lean mixture, e.g. diesel engines and lean burn spark ignition engines employing stratified charge methods, since the quantity of air present in excess causes additional cooling of the exhaust gas. For this reason, the catalysts in this case are being installed ever nearer to the engine (close-coupled) to ensure that as little heat as possible is lost as the exhaust gas flows from the outlet of the cylinder toward the catalyst. Moreover, in many cases the exhaust pipes between the manifold and the catalyst are already thermally insulated.

In addition to the warm-up phase of the engine (cold starting conditions), low exhaust gas temperatures also occur more frequently during driving. This is the case when the engine is no longer performing any positive work, e.g. when the vehicle is being slowed and the engine is operating in overrun mode. In this case, the intake air is generally passed unthrottled through the engine and into the exhaust section and further cools both the engine and the exhaust gas aftertreatment system and the catalysts contained therein.

In the high load ranges of a spark ignition engine, in contrast, it is quite possible for temperatures of over 1000° C. to be reached in the close-coupling zone of the exhaust section. It is therefore necessary to protect especially the catalysts situated in this zone from excessive temperatures.

The protection of motor vehicle exhaust gas catalysts from excessively high or excessively low temperatures is sufficiently well known to those skilled in the art. Thus, EP 640757 proposes providing appropriate control of the air/fuel mixture fed to the engine for combustion for the purpose of protection against overheating or in the case of cold starting conditions.

JP 2003193895 likewise describes a method of controlling the intake air and the ignition point as a function of road speed, especially in the case of relatively cool exhaust gas conditions, in order to protect the catalyst from excessively low exhaust gas temperatures. In the case of gasoline to which alcohol has been added, the combustion temperature is lower than in the case of pure gasoline. Here, it is even more difficult to maintain a particular exhaust gas temperature in order to remain within the optimum working range of the exhaust gas purification catalysts. The proposal is to raise the exhaust gas temperature by adapting the ignition point. It would likewise be possible to employ control of the intake air temperature and of the exhaust gas back pressure.

In order to achieve as rapid as possible heating of the catalyst under cold starting conditions, EP 2146071 proposes to pass the exhaust gas directly to the catalyst, bypassing the turbocharger, until the catalyst has reached its working temperature. In order to raise catalysts to the operating temperature as quickly as possible, it has also been proposed to heat them by means of external sources. The latter can likewise be achieved by using certain burners in the exhaust section (DE 102008007844).

In certain driving situations, in which the catalysts in the exhaust section are exposed to an elevated temperature, they should be protected from excessively high temperature peaks. Strategies for avoiding damage to the catalysts caused by such high temperatures are mentioned in DE 2409643 and in DE 1451881, for example. The latter publication proposes bypass lines around the catalyst.

It is the object of the present invention to specify a method which makes it possible to protect catalyst systems for purifying exhaust gases from undercooling or overheating in a manner which is as simple as possible but which is no less effective.

This and further objects arising from the prior art in an obvious way are achieved by a method having the features of the present claim 1. The subclaims dependent on claim 1 relate to preferred embodiments of the method according to the invention.

The stated object is achieved in an extremely elegant but no less advantageous way by virtue of the fact that, in a method for the catalytic purification of the exhaust gas from internal combustion engines by means of a catalyst system having a main exhaust section (8) containing at least one first close-coupled catalyst (4) and a secondary exhaust section (9) as well as a switchover device (7) for switching the exhaust flow to the main exhaust section and/or the secondary exhaust section, the exhaust gas is preferably passed via the main exhaust section (8) when the engine is performing positive work and is preferably passed via the secondary exhaust section (9) when the engine (1) is not performing any positive work. By means of the method according to the invention, cold exhaust gas is prevented from further cooling down the at least one close-coupled catalyst during the overrun operation of the engine, for example. In this way, it is also simultaneously possible to protect the catalyst system from excessive catalyst aging of the at least one close-coupled catalyst (4) situated in the main exhaust section (8). Direct injection gasoline engines, in particular, are generally operated with a stoichiometric mixture at higher loads and engine speeds, even if they can be operated with a stratified charge at lower loads. In this case, increased catalyst aging always occurs at elevated temperatures if the catalyst is exposed to oxygen-rich exhaust gas (see below). This is the case when the engine suddenly no longer needs to perform any positive work (e.g. during deceleration of the vehicle in an overrun mode after high load operation). Here too, the oxygen-rich exhaust gas can be guided around the at least one close-coupled catalyst (4) via the secondary exhaust section (9). According to the invention, it is protected in this way from excessive aging due to oxygen loading at elevated temperatures.

The lean burn internal combustion engine no longer performs any positive work when no fuel is fed to the engine but the engine continues to turn, being driven by the mass (inertial mass or gravitational mass) of the vehicle. This is the case when the engine is in "overrun mode". This is present, for example, when a deceleration phase occurs, e.g. due to braking—possibly due to an engine brake—of the vehicle, i.e. the speed of the vehicle decreases and the engine is no longer fed any fuel (overrun cutoff). However, in this phase the engine is still coupled to the transmission, and a gear is selected. Here, it is usually the case that only air is pumped via the intake duct into the exhaust system via the turning engine. Such a mode of operation is present, for example, as a red light is approached or in the case of a rapid approach to a slower vehicle and when descending a slope or during a braking operation. Moreover, the fuel supply to the engine is also briefly cut off during the disengagement of the engine from the transmission, and this leads to air being pumped through the engine into the exhaust section, e.g. during a gear change.

As stated, guiding the exhaust gas past the at least one close-coupled catalyst (4) is initiated during a phase in which the engine is not performing any positive work, i.e. is no longer being supplied with fuel (overrun cutoff). The exact time for switching the switchover device (7) preferably occurs when there is a risk that the exhaust gas, which is enriched with oxygen owing to the fuel being cut off, will reach the at least one close-coupled catalyst. The switchover of the switchover device (7) can therefore take place either as soon as the engine controller detects that the engine is no longer being supplied with fuel but the engine is nevertheless still turning and/or when, for example, a sharp decrease in temperature is measured at the temperature sensor (15) and/or when, for example, the lambda probe (11) detects a very high oxygen content in the exhaust gas. For identification of the switchover time, it is furthermore also possible to refer to the engine speed together with the fuel supply or the pedal value of the gas pedal, for example. The important point in the switchover is that, as far as possible, no oxygen-rich exhaust gas can reach the catalyst (4). The person skilled in the art will use the possibilities made available by sensors and the engine controller to perform control in accordance with the invention of the switchover device (7).

As already indicated above, the engine continues to turn in overrun mode when the fuel supply is cut off and thus pumps oxygen-rich exhaust gas into the exhaust duct. On the one hand, this entails an increase in the oxygen content of the exhaust gas and, on the other hand, a reduction in temperature since, by the very nature of the case, the intake air has been taken from the environment and has been heated up in the engine only under limited conditions. Using a lambda probe (11) to detect the oxygen content of the exhaust gas would therefore be an elegant solution.

A preferred option is therefore to control the switchover of the switchover device (7) by means of the engine controller. It is furthermore a particularly preferred option to pass the exhaust gas at least partially via the secondary exhaust section (9) only when a certain exhaust gas temperature and/or a certain lambda value in the exhaust gas is overshot or undershot.

In addition to the low exhaust gas temperatures during the cold starting of the engine, which have already been discussed at the outset, there are—as stated—driving situations in which the exhaust gas can cool down below a critical level. This is the case when the engine is not performing any positive work, e.g. when the vehicle is being slowed and the engine is being operated in overrun mode. In this case, the intake air is generally passed unthrottled through the engine into the exhaust section and further cools both the engine and the exhaust gas aftertreatment system and the catalysts contained therein. When the exhaust gas temperature ahead of the close-coupled catalyst (4) is in the range of the light-off temperature of the corresponding catalyst or below, the method according to the invention is used to prevent the catalyst (4) in the main exhaust section from being cooled too much by the cold air from the engine during the overrun mode. Depending on the type of catalyst and the state of aging of the catalyst, the light-off temperature is generally between 200° C. and 350° C. In the range below this exhaust gas temperature of 350° C., preferably below 300° C., particularly preferably below 250° C., the method is thus used to prevent the catalysts from cooling down and thus also to ensure a higher purifying effect of the catalysts even at very low exhaust gas temperatures such as those which occur at low vehicle speeds, for example. The "light-off temperature" refers to the exhaust gas temperature at which 50% of a particular pollutant in the exhaust gas is converted by the corresponding catalyst. In the present case, the light-off temperatures for the unburnt hydrocarbons (HC) and carbon monoxide (CO) in the exhaust gas are preferably intended.

If, on the other hand, the exhaust gas temperature in the close-coupled catalyst (4) is very high, the method according to the invention can serve to reduce the thermal damage to the catalyst. This applies particularly to motor vehicles with gasoline engines since these can have very high exhaust gas temperatures of over 1000° C. in the close-coupling zone. The composition of the exhaust gas from gasoline engines is usually stoichiometric, which means that the oxygen content of the exhaust gas is only very low after the reaction with the catalyst. From the literature, it is known that catalysts containing noble metals, especially, are exposed to particularly severe deactivation due to thermal damage when there is oxygen in the exhaust gas (Untersuchungen zur katalytischen Aktivität eines Diesel-DeNOx-Katalysators auf der Basis von Pt/Al2O3, Dissertation S. Eckhoff, 1998; Journal of Catal. 109, 433-462 (1988)). A study by C. Brinkmeier et. al. (Abgasnachbehandlung mit NOx-Speicherkatalysatoren für die strahlgeführte Benzindirekteinspritzung, Emission Control, Dresden 2006) furthermore shows that NOx storage catalysts are damaged much more severely if oxygen-rich exhaust gas impinges upon the catalyst at high exhaust gas temperatures of 830° C. than if the catalyst is operated at this temperature with stoichiometric or slightly rich exhaust gas compositions. The fact that oxygen-containing exhaust gas flows through the catalyst during the overrun mode of the engine at high exhaust gas temperatures (referred to as "overrun cutoff" or "fuel cut" operation) should not be prevented in principle for reasons of drivability since throttling the intake air would brake the vehicle too severely. However, the method according to the invention ensures that the oxygen-rich exhaust gas is guided past the close-coupled catalyst (4) during the overrun mode of the engine at high temperatures, thereby significantly reducing deactivation of the catalyst. The method according to the invention should preferably be used when the temperature is over the exhaust gas temperature above which the respective catalyst undergoes severe deactivation in the presence of oxygen. In the case of three-way catalysts, this value is above about 800° C., preferably above 750° C. and particularly preferably above 700° C., and, in the case of NOx storage catalysts, it is at values above 700° C., preferably above 650° C. and particularly preferably above 600° C.

As already indicated, the catalyst system under consideration consists at least of at least one first close-coupled catalyst (4) in the main exhaust section (8), a switchover device (7) and a secondary exhaust section (9).

All exhaust gas purification catalysts known for this purpose to those skilled in the art are suitable as catalysts that can be close-coupled in the main exhaust section (8) in the present method. The close-coupled catalysts are preferably selected from the group comprising three-way catalysts (TWC), NOx storage catalysts (NSC) and oxidation catalysts (DOC) wherein, if appropriate, these can be present as a coating on a particulate filter (see also DE 102010033688, EP 1486248). It is also possible to use a plurality of catalysts positioned one behind the other as close-coupled catalysts in the main exhaust section (8). As a particularly preferred option, the first close-coupled catalyst is selected from the group comprising three-way catalysts and NOx storage catalysts or from a combination of these catalysts arranged in series. It is also possible for these catalytic coatings to be present as zones on a catalyst or in the form of two catalyst layers arranged one on top of the other, for example. The use of an NOx storage close-coupled catalyst is very particularly preferred.

In another embodiment of the invention, it is preferred if the main exhaust section (8) and the secondary exhaust section (9) open into a common exhaust section (10), in which at least one further catalyst (6) is arranged. This catalyst is predominantly responsible for exhaust gas purification when the exhaust gas is passed via the secondary exhaust section (9). For this reason, it is expedient here to use a catalyst which can provide high conversion of pollutants even under lean exhaust gas conditions. Preferred catalysts that can be used at this position are oxidation catalysts, NOx storage catalysts, three-way catalysts, SCR catalysts (SCR), N$_2$O decomposition catalysts and hydrocarbon storage catalysts (HC adsorbers), for example. The use of three-way, N$_2$O decomposition and NOx storage catalysts is particularly preferred. The use of a three-way catalyst as catalyst (6) is very particularly preferred.

In a preferred further embodiment, a further catalyst (5) can be used in the secondary exhaust section (9). According to the invention, catalysts at this position are exposed to oxygen-rich exhaust gas and should therefore have a higher stability in the oxygen-rich exhaust gas than the catalyst (4) in the main exhaust section. Preferred catalysts that can be used at this position are oxidation catalysts, NOx storage catalysts, three-way catalysts and hydrocarbon storage catalysts, for example. The use of an oxidation catalyst with an integrated hydrocarbon storage function is very particularly preferred.

The catalytically active components discussed above are preferably applied to a substrate as a support. In this context, the substrate can consist either of a conventional channel flow monolith, a deep bed filter or a wall-flow monolith with a particulate filter function. Those skilled in the art know which substrates should be used, given the exhaust gas purification task to be performed. The various types of catalysts and catalyst coatings on supporting substrates of different kinds that are indicated for use according to the invention at the three abovementioned positions in FIG. 1 (catalysts 4, 5 and 6) can be found in DE102010033688, DE102010033689, EP1486248 and WO11124357, including the references therein.

An exhaust gas aftertreatment system is illustrated schematically in FIG. 1. In normal driving, during which the engine must perform positive work, the exhaust gas is passed via the valve (7) into the main exhaust section (8) and across the catalysts (4) and (6). As soon as the engine is operated in an overrun mode and is no longer performing any positive work, the valve (7) can be switched over, and the cold exhaust flow is passed into the secondary exhaust section (9) across the optional catalyst (5) and catalyst (6). As a result, the catalyst (4) in the main exhaust section is not cooled as much as in conventional systems that do not have a secondary exhaust section.

In another embodiment of the invention, this method is employed to protect the catalyst (4) from excessive catalyst aging. Lean burn spark ignition engines, in particular, are generally operated stoichiometrically at relatively high loads and engine speeds, even if they can be operated with a stratified charge at lower loads. Increased catalyst aging occurs at elevated temperatures whenever the catalyst is exposed to oxygen-rich exhaust gas (fuel cut). This is the case when the engine overruns (deceleration of the vehicle) or when shift operations are performed, for example. To prevent oxygen-rich exhaust gas flowing through the catalyst (4) at elevated temperatures (of >600° C., measured at the temperature sensor (15), for example), the exhaust gas flow is briefly passed via the secondary exhaust flow (9) in the overrun mode of the engine or during shift operations, as described above. The exhaust gases continue to be purified by means of the optional catalyst (5) and/or catalyst (6). This allows the use of catalyst coatings in catalyst (4) which have a very high catalytic activity at low exhaust gas temperatures but have a lower thermal stability than conventional catalysts.

According to the invention, the close-coupling zone should be regarded as a zone 10-120 cm from the cylinder outlet, preferably 20-100 cm, particularly preferably 20-80 cm.

The mode of operation described here for an exhaust gas purification system was unknown to those skilled in the art before the priority date. It is therefore surprising that a simple procedure such as that described here makes it possible to operate exhaust systems having a plurality of catalysts more effectively by means of control in accordance with the invention, resulting ultimately in better purification of the exhaust gases. The advantages of the method according to the invention also lie in the fact that less noble metal has to be used in the catalyst by virtue of the low level of damage to the catalysts, and this leads to a significant cost saving.

The structure of the system is illustrated by way of example in FIG. 1.

1. engine
2. cylinder
3. exhaust system
4. catalyst
5. optional catalyst
6. catalyst
7. switchover device, e.g. exhaust butterfly or exhaust valve for switching the exhaust flow to the main exhaust section and/or the secondary exhaust section
8. main exhaust section
9. secondary exhaust section
10. common exhaust section
11. lambda sensor and/or NOx sensor
12. lambda sensor and/or NOx sensor
13. lambda sensor and/or NOx sensor
14. lambda sensor and/or NOx sensor
15. temperature sensor
16. lambda sensor and/or NOx sensor

The invention claimed is:

1. A method for the catalytic purification of the exhaust gas from internal combustion engines by means of a catalyst system having a main exhaust section containing at least one first close-coupled catalyst and a secondary exhaust section as well as a switchover device for switching the exhaust flow to the main exhaust section and/or the secondary exhaust section, comprising
    determining whether or not the engine is performing positive work and
    passing the exhaust gas via the main exhaust section when the engine is determined to be performing positive work; and
    passing the exhaust gas via the secondary exhaust section when the engine is determined to be not performing any positive work and a certain exhaust gas temperature, which is less than or equal to the light-off temperature of the catalyst, is undershot or an exhaust gas temperature of 600° C. is overshot.

2. The method as claimed in claim 1, wherein
    the catalyst in the main exhaust section comprises a catalyst selected from a TWC, a DOC and an NSC.

3. The method as claimed in claim 1, wherein
    the main exhaust section and the secondary exhaust section open into a common exhaust section, in which at least one further catalyst is arranged.

4. The method as claimed in claim 3, wherein
    the catalyst in the common exhaust section comprises a catalyst selected from a TWC, a DOC, an NSC, an SCR, an $N_2O$ decomposition catalyst, and an HC absorber.

5. The method as claimed in claim 1, wherein
    a further catalyst is arranged in the secondary exhaust section.

6. The method as claimed in claim 5, wherein
    the catalyst in the secondary exhaust section comprises a catalyst selected from a TWC, an NSC, a DOC, and an HC absorber.

7. A method for the catalytic purification of exhaust gas from an internal combustion engine by a catalyst system comprising a main exhaust section containing at least one first close-coupled catalyst, a secondary exhaust section, and a switchover device for switching a flow of the exhaust gas between the main exhaust section and the secondary exhaust section, the method comprising
    passing the exhaust gas via the main exhaust section when the engine is performing positive work, and
    passing the exhaust gas via the secondary exhaust section:
        i) when the engine is not performing any positive work and an exhaust gas temperature, which is less than or equal to the light-off temperature of the catalyst, is undershot, and
        ii) when the engine is not performing any positive work and an exhaust gas temperature of 600° C. is overshot.

8. The method as claimed in claim 7, wherein
    the catalyst in the main exhaust section comprises a catalyst selected from a TWC, a DOC, and an NSC.

9. The method as claimed in claim 7, wherein
    the main exhaust section and the secondary exhaust section open into a common exhaust section, in which at least one further catalyst is arranged.

10. The method as claimed in claim 9, wherein
    the catalyst in the common exhaust section comprises a catalyst selected from a TWC, a DOC, an NSC, an SCR, an $N_2O$ decomposition catalyst, and an HC adsorber.

11. The method as claimed in claim 7, wherein
    a further catalyst is arranged in the secondary exhaust section.

12. The method as claimed in claim 11, wherein
    the catalyst in the secondary exhaust section comprises a catalyst selected from a TWC, an NSC, a DOC, and an HC adsorber.

13. A method for the catalytic purification of exhaust gas from an internal combustion engine by a catalyst system comprising a main exhaust section containing at least one first close-coupled catalyst, a secondary exhaust section, and a switchover device for switching a flow of the exhaust gas between the main exhaust section and the secondary exhaust section, the method comprising
    passing the exhaust gas via the main exhaust section when the engine is performing positive work, and
    passing the exhaust gas via the secondary exhaust section:
        when the engine is not performing any positive work and an exhaust gas temperature, which is less than or equal to the light-off temperature of the catalyst, is undershot.

14. The method as claimed in claim 13, wherein the catalyst in the main exhaust section comprises a catalyst selected from a TWC, a DOC, and an NSC.

15. The method as claimed in claim 13, wherein the main exhaust section and the secondary exhaust section open into a common exhaust section, in which at least one further catalyst is arranged.

16. The method as claimed in claim 15, wherein the catalyst in the common exhaust section comprises a catalyst selected from a TWC, a DOC, an NSC, an SCR, an $N_2O$ decomposition catalyst, and an HC adsorber.

17. The method as claimed in claim 13, wherein a further catalyst is arranged in the secondary exhaust section.

18. The method as claimed in claim 17, wherein the catalyst in the secondary exhaust section comprises a catalyst selected from a TWC, an NSC, a DOC, and an HC adsorber.

* * * * *